(12) United States Patent
Lin

(10) Patent No.: US 10,248,855 B2
(45) Date of Patent: Apr. 2, 2019

(54) METHOD AND APPARATUS FOR IDENTIFYING GESTURE

(71) Applicant: Beijing Xiaomi Mobile Software Co., Ltd., Haidian District, Beijing (CN)

(72) Inventor: Xingsheng Lin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/784,662

(22) Filed: Oct. 16, 2017

(65) Prior Publication Data

US 2018/0107869 A1  Apr. 19, 2018

(30) Foreign Application Priority Data

Oct. 19, 2016  (CN) .......................... 2016 1 0913061

(51) Int. Cl.
*G06F 3/01*        (2006.01)
*G06K 9/00*        (2006.01)
*G06F 16/583*     (2019.01)
*G06T 7/55*        (2017.01)
*G06K 9/20*        (2006.01)

(52) U.S. Cl.
CPC ......... *G06K 9/00355* (2013.01); *G06F 3/017* (2013.01); *G06F 16/5838* (2019.01); *G06K 9/00362* (2013.01); *G06K 9/2054* (2013.01); *G06T 7/55* (2017.01); *G06K 9/209* (2013.01); *G06K 2009/00395* (2013.01)

(58) Field of Classification Search
None
See application file for complete search history.

(56) References Cited

U.S. PATENT DOCUMENTS

| | | | | |
|---|---|---|---|---|
| 9,857,868 | B2 * | 1/2018 | Plagemann | G06F 3/011 |
| 2010/0111358 | A1 * | 5/2010 | Chai | G06K 9/00335 382/103 |
| 2010/0295783 | A1 * | 11/2010 | El Dokor | G06F 3/017 345/158 |
| 2013/0182902 | A1 | 7/2013 | Holz | |
| 2015/0062003 | A1 * | 3/2015 | Rafii | G06F 3/017 345/156 |
| 2017/0045950 | A1 * | 2/2017 | El Dokor | G06F 3/017 |

OTHER PUBLICATIONS

European Patent Office, Extended European Search Report issued in corresponding EP Application No. 17196962.9, dated Jan. 22, 2018, 9 pages.

* cited by examiner

*Primary Examiner* — Nancy Bitar
(74) *Attorney, Agent, or Firm* — Arch & Lake LLP

(57) ABSTRACT

The present disclosure relates to a method and a device for identifying a gesture. The method includes: determining a depth of each pixel in each of a plurality of images to be processed, in which the plurality of images to be processed are separately collected by the plurality of cameras, and the depth is configured to at least partially represent a distance between an actual object point corresponding to each pixel and the mobile apparatus; determining a target region of each of the images to be processed according to the depth; and determining a gesture of a target user according to image information of the target regions.

15 Claims, 4 Drawing Sheets

METHOD AND APPARATUS FOR IDENTIFYING GESTURE

CROSS-REFERENCE TO RELATED APPLICATION

This application is based on and claims priority to Chinese Patent Application No. 201610913061.6, filed on Oct. 19, 2016, the entire contents of which are incorporated herein by reference.

TECHNICAL FIELD

The present disclosure generally relates to virtual reality technology field, and more particularly, to a method and an apparatus for identifying a gesture.

BACKGROUND

With rapid development of virtual reality (VR) technology based on mobile apparatuses, a user can realize application functions under VR environment using a VR headset in combination with a mobile apparatus. For example, the user can play online games in the mobile apparatus using the VR headset. Human-computer interaction operation is usually involved in the process of using the VR headset.

In the related art, information input by the user can be identified by gesture identification. In the gesture identification process, the mobile apparatus needs to analyze and process images collected by a camera, so as to determine a position of a hand of a target user, and then determine a gesture of the user according to the hand. Computation in image processing in this technical solution is very large, and when there are one or more hands in an image, the mobile apparatus may not be able to correctly identify the hand of the target user, such that input of effective information cannot be realized.

SUMMARY

A method for identifying a gesture is provided, which is applied in a mobile apparatus with a plurality of cameras and includes: determining a depth of each pixel in each of images to be processed, in which the images to be processed are collected by the plurality of cameras separately, and the depth is configured to at least partially represent a distance between an actual object point corresponding to each pixel and the mobile apparatus; determining a target region of each of the images to be processed according to the depth; and determining a gesture of a target user according to image information of target regions.

An apparatus for identifying a gesture is provided, which is applied in a mobile apparatus with a plurality of cameras, and includes: a processor; and a memory for storing instructions executable by the processor; in which the processor is configured to: determine a depth of each pixel in each of images to be processed, in which the images to be processed are collected by the plurality of cameras separately, and the depth is configured to at least partially represent a distance between an actual object point corresponding to each pixel and the mobile apparatus; determine a target region of each of the images to be processed according to the depth; and determine a gesture of a target user according to image information of target regions.

A non-transitory computer-readable storage medium having stored therein instructions that, when executed by a processor of a mobile apparatus, causes the mobile apparatus to perform a method for identifying a gesture, in which the mobile apparatus has a plurality of cameras, and the method includes: determining a depth of each pixel in each of images to be processed, in which the images to be processed are collected by the plurality of cameras separately, and the depth is configured to at least partially represent a distance between an actual object point corresponding to each pixel and the mobile apparatus; determining a target region of each of the images to be processed according to the depth; and determining a gesture of a target user according to image information of target regions.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1A:
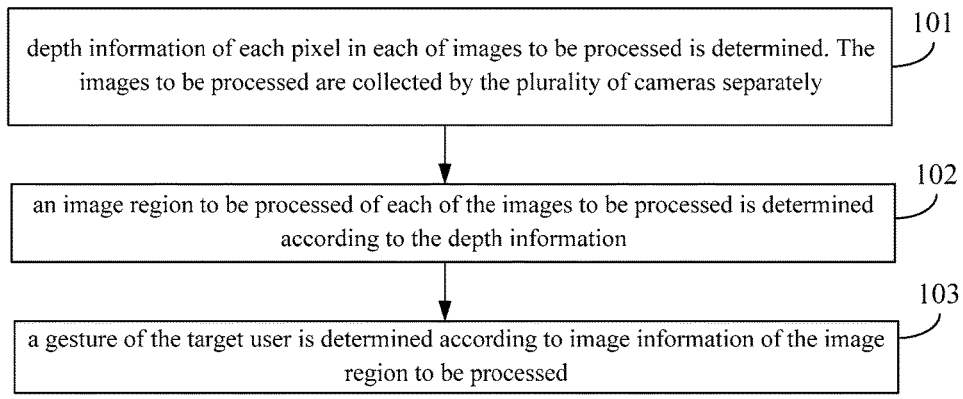
FIG. 1A is a flow chart illustrating a method for identifying a gesture, according to an aspect of the disclosure.
Figure 1B:
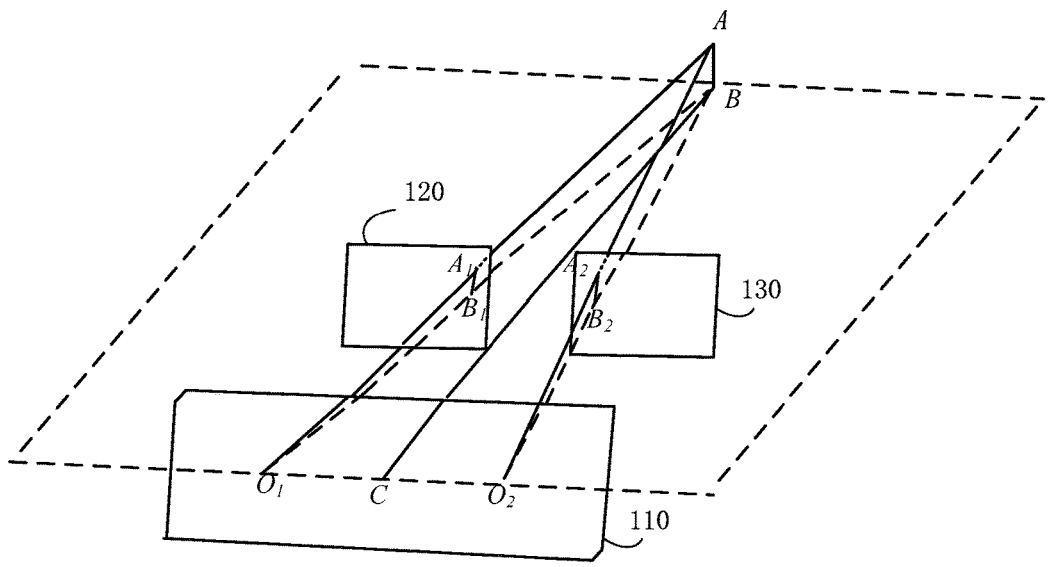
FIG. 1B is a schematic diagram illustrating determining a depth of each pixel with two cameras, according to an aspect of the disclosure.

FIG. 1A is a flow chart illustrating a method for identifying a gesture, according to an aspect of the disclosure. FIG. 1B is a schematic diagram illustrating determining a depth of each pixel with two cameras, according to an aspect of the disclosure. The method for identifying a gesture may be applied to a mobile apparatus with a plurality of cameras, for example, may be applied to a smartphone or a tablet computer. As illustrated in FIG. 1A, the method for identifying a gesture includes following acts.

In block 101, a depth of each pixel in each of images to be processed is determined. The images to be processed are collected by the plurality of cameras separately. For example, the images to be processed are respectively collected by the plurality of cameras.

In one or more embodiments, the depth is configured to at least partially represent a distance between an actual object point corresponding to each pixel and the mobile apparatus.

For example, as illustrated in FIG. 1B, a first camera $O_1$ of a mobile apparatus 110 photographs an actual object point A on an image plane 120, and a second camera $O_2$ of the mobile apparatus 110 photographs the actual object point A on an image plane 130. A distance BC between the actual object point A and the mobile apparatus 110 can be calculated according to a focal length of the first camera $O_1$, a focal length of the second camera $O_2$, and a trigonometric relationship in FIG. 1B.

In block 102, an image region to be processed of each of the images to be processed is determined according to the depth. The image region to be processed may also be referred as the target region.

Figure 2:
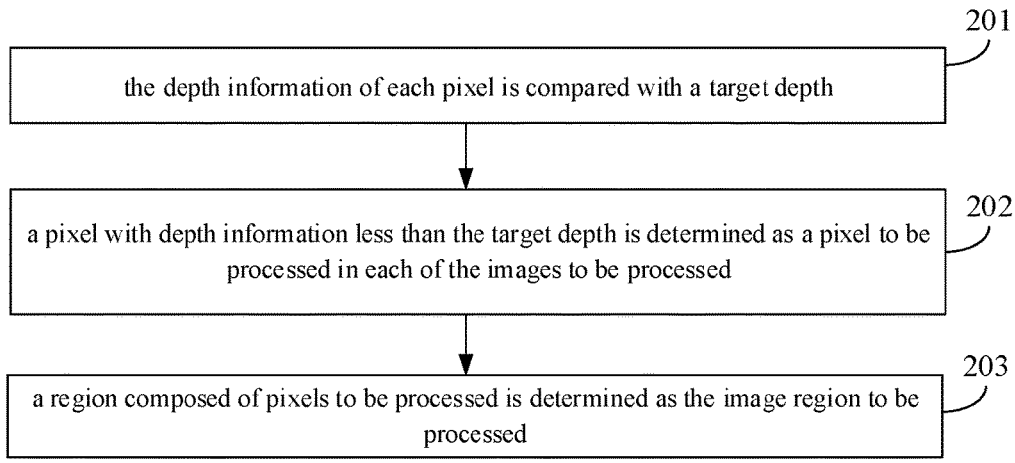
FIG. 2 is a flow chart illustrating determining a target region according to the depth, according to a first aspect of the disclosure.

In one or more embodiments, a method for determining the target region of each of the images to be processed according to the depth may refer to embodiments illustrated in FIG. 2, which is not described in detail herein.

For example, the target region is configured to represent a region for identifying a gesture. The camera may collect a lot of invalid background information in actual collection of hand actions of a target user. For example, a background behind hands of the target user, such as a wall. The invalid background information can be marked as an image region not to be processed according to the depth of each pixel in the images to be processed, thus reducing computation in image processing.

In block 103, a gesture of the target user is determined according to image information of image regions to be processed.

In this embodiment, the mobile apparatus with the plurality of cameras can determine the depth of each pixel in each of the collected images to be processed, and determine the target region which contains hand image of the target user according to the depth of each pixel, and then process the image regions to be processed so as to realize gesture identification of the target user, such that a problem of large computation in image processing caused by processing the whole image to be processed in the related art is solved, and a problem that input of effective information cannot be realized when there are one or more hands in the image in the related art is solved, thus improving user experience in virtual reality when the user inputs information.

In one or more embodiments, determining a depth of each pixel in each of the images to be processed may include following acts. Camera parameters of the plurality of cameras are determined. The depth of each pixel in each of the images to be processed is calculated according to the camera parameters of the plurality of cameras.

In one or more embodiments, determining a target region of each of the images to be processed according to the depth may include following acts. The depth of each pixel is compared with a target depth. The target depth is configured to represent a maximum distance between a hand of the target user and the mobile apparatus. A pixel having a depth less than the target depth is determined as a pixel to be processed in each of the images to be processed. A region composed of pixels to be processed is determined as the target region.

In one or more embodiments, the method may further include following acts. A first physical characteristic of the target user is determined by querying a first characteristic database. The first characteristic database is configured to record user identification information and first physical characteristics corresponding to the user identification information. The target depth is calculated according to the first physical characteristic.

In one or more embodiments, the method may further include following acts. A second physical characteristic of the target user is determined by querying a second characteristic database. The second characteristic database is configured to record user identification information and second physical characteristics corresponding to the user identification information. A first physical characteristic of the target user is determined according the second physical characteristic. The target depth is calculated according to the first physical characteristic. The second physical characteristic may also be referred as the additional physical characteristic.

In an embodiment, the method may further include following acts. A plurality of reference distances between the hand of the target user and the mobile apparatus is determined according to history image data collected by the plurality of cameras separately. A maximum of the plurality of reference distances is determined. The maximum of the plurality of reference distances is determined as the target depth.

Details on how to identify a gesture can refer to following embodiments.

Technical solutions provided by the present disclosure will be described below with reference to following embodiments.

FIG. 2 is a flow chart illustrating determining a target region according to the depth, according to a first aspect of the disclosure. In this embodiment, by using the method provided in the above embodiments of the present disclosure, and by taking a mobile apparatus with a plurality of cameras as an example, an exemplary illustration of determining a target region is made. As illustrated in FIG. 2, determining a target region according to the depth includes following acts.

In block 201, the depth of each pixel is compared with a target depth.

In one or more embodiments, the target depth is configured to represent a maximum distance between a hand of the target user and the mobile apparatus.

Figure 3:
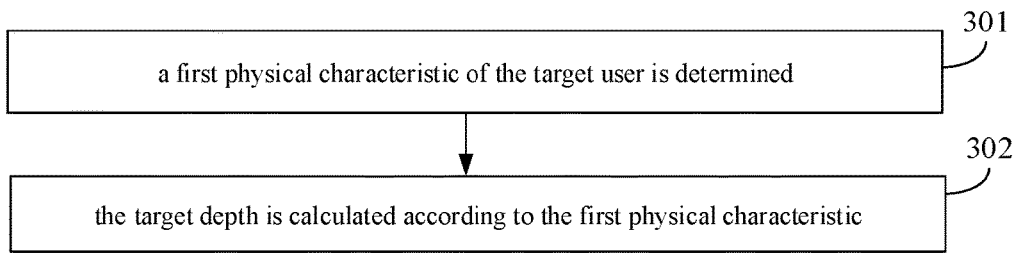
FIG. 3 is a flow chart illustrating determining a target depth by querying a characteristic database, according to a second aspect of the disclosure.
Figure 4:
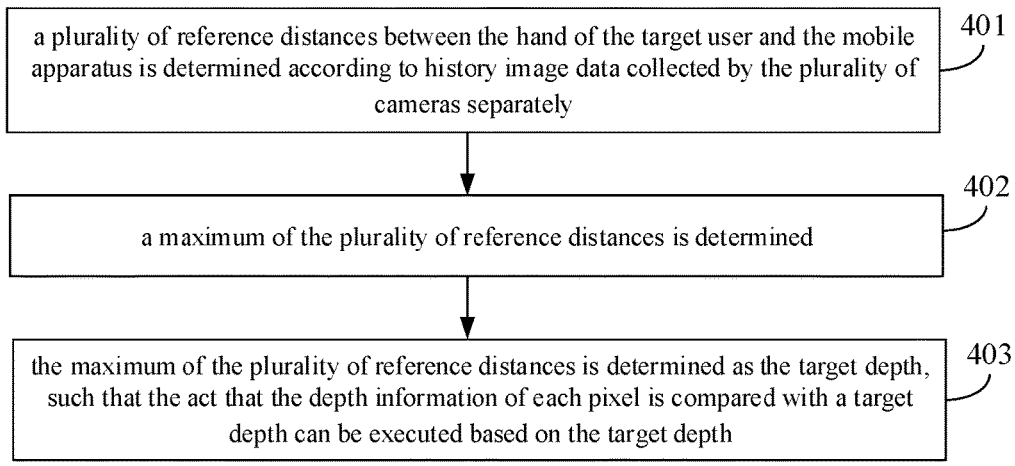
FIG. 4 is a flow chart illustrating determining a target depth according to history image data, according to a third aspect of the disclosure.

Here, the target depth can be obtained according to examples illustrated in FIG. 3 and FIG. 4.

In block 202, a pixel having a depth that is less than the target depth is determined as a pixel to be processed in each of the images to be processed.

In block 203, a region composed of pixels to be processed is determined as the target region.

In one or more embodiments, by comparing the depth of each pixel with the target depth, effective pixels to be processed can be determined, and then the target region is determined. Because the target depth is configured to represent the maximum distance between the hand of the target user and the mobile apparatus, the target region which is determined according to the target depth represents a region containing the hand of the target user, and a region other than the target region is a region where it is impossible to contain the hand of the target user. By analyzing and identifying the target region only, computation in image processing is reduced. The proposed method and the problem that a hand action occurring in the region outside the target region is identified as the gesture of the target user is avoided, thus realizing input of effective information.

FIG. 3 is a flow chart illustrating determining a target depth by querying a characteristic database, according to a second aspect of the disclosure. In this embodiment, by using the method provided in the above embodiments of the present disclosure, and by taking a mobile apparatus with a plurality of cameras as an example, an exemplary illustration of determining a target depth by querying a characteristic database is made. As illustrated in FIG. 3, determining a target depth by querying a characteristic database includes following acts.

In block 301, a first physical characteristic of the target user is determined.

In one or more embodiments, the first physical characteristic may be a length of arms of a user. For example, the first physical characteristic is 75 centimeter.

Here, the first physical characteristic of the target user may be determined by querying a first characteristic database according to a user account of the target user. For example, when the user is operating an application in the mobile apparatus, such as playing an online game named "Affected The Manor", the user may be requested to provide his first physical characteristic. Then his first physical characteristic is stored in the first characteristic database. When the user plays online games with a VR helmet later, the first physical characteristic of the user can be determined according to a login account of the user.

In the disclosure, a second physical characteristic of the target user may be determined by querying a second characteristic database according to a user account of the target user. For example, the second physical characteristic may be a height of a user. Then the first physical characteristic of the target user can be determined according to the second physical characteristic. For example, a length of arms of a user with a height of 1.7 meter is usually 75-80 centimeter, such that the length of arms of the user can be marked as a maximum of the range from 75 to 80 centimeter, i.e., 80 centimeter.

For example, after the second physical characteristic of the target user is determined, a first physical characteristic corresponding to the second physical characteristic may be determined by accessing a network server. Alternatively or additionally, a characteristic matching list may be realized locally, and the characteristic matching list records first physical characteristics corresponding to second physical characteristics respectively.

In block 302, the target depth is calculated according to the first physical characteristic.

In one or more embodiments, the target depth can be calculated according to formula (1), $$L = w * T \quad (1)$$

where, L represents the target depth, w represents a weight coefficient, and T represents a characteristic value of the first physical characteristic.

For example, the weight coefficient w can be obtained by analyzing a using habit of a user in a period when the user initially uses a VR device (for example, a month when the VR device is initially used). For example, some users are accustomed to straighten their arms when they making gestures, then the weight coefficient w may be larger for these users, 0.9 for example, while some users are accus-tomed to bend their arms when they making gestures, then the weight coefficient w may be smaller for these users, 0.6 for example.

Here, when determining the target depth, the first physical characteristic (such as the length of arm) of the target user can be obtained by querying the first characteristic database, and then the target depth is calculated; alternatively, the second physical characteristic (such as the height) of the target user can be obtained by querying the second characteristic database, then a first physical characteristic is determined according to the second physical characteristic, and then the target depth is calculated, such that the target depth can be determined flexibly, thus improving the user experience in virtual reality when the user inputs information.

FIG. 4 is a flow chart illustrating determining a target depth according to history image data, according to a third aspect of the disclosure. In this embodiment, by using the method provided in the above embodiments of the present disclosure, and by taking a mobile apparatus with a plurality of cameras as an example, an exemplary illustration of determining a target depth according to history image data is made. As illustrated in FIG. 4, determining a target depth according to history image data includes following acts.

In block 401, a plurality of reference distances between the hand of the target user and the mobile apparatus is determined according to history image data collected by the plurality of cameras separately.

In one or more embodiments, the plurality of reference distances between the hand of the target user and the mobile apparatus can be determined by analyzing history image data in a period when the user initially uses a VR device (for example, a week when the VR device is initially used). For example, a depth when the user performs some gestures is 0.6 meter, and a depth when the user performs some other gestures is 0.55 meter, then the plurality of reference distances can be obtained by analyzing different image data.

In block 402, a maximum of the plurality of reference distances is determined.

In block 403, the maximum of the plurality of reference distances is determined as the target depth, such that the act that the depth of each pixel is compared with a target depth can be executed based on the target depth.

In one or more embodiments, the reference distances between the hand of the target user and the mobile apparatus can be analyzed according to the history image data, and then the target depth is calculated, thus making the target depth more in line with the user's actual physical characteristics and using habits. For example, for two users with an arm length of 60 centimeter, a difference between target depths of the two users may be 10-20 centimeter because of different habits for stretching arms. Therefore, the target depth determined by analyzing history image data can adapt to the target user better.

Figure 5:
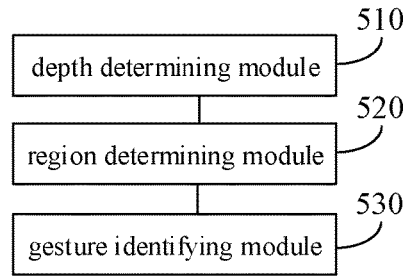
FIG. 5 is a block diagram illustrating a device for identifying a gesture, according to an aspect of the disclosure.

FIG. 5 is a block diagram illustrating a device for identifying a gesture, according to an aspect of the disclosure. The device for identifying a gesture is applied to a mobile apparatus with a plurality of cameras. As illustrated as FIG. 5, the device for identifying a gesture includes a depth determining module 510, a region determining module 520, and a gesture identifying module 530.

The depth determining module 510 is configured to determine a depth of each pixel in each of images to be processed. The images to be processed are collected by the plurality of cameras separately. The depth is configured to at least partially represent a distance between an actual object point corresponding to each pixel and the mobile apparatus.

The region determining module 520 is configured to determine a target region of each of the images to be processed according to the depth determined by the depth determining module 510.

The gesture identifying module 530 is configured to determine a gesture of a target user according to image information of image regions to be processed which are determined by the region determining module 520.

Figure 6:
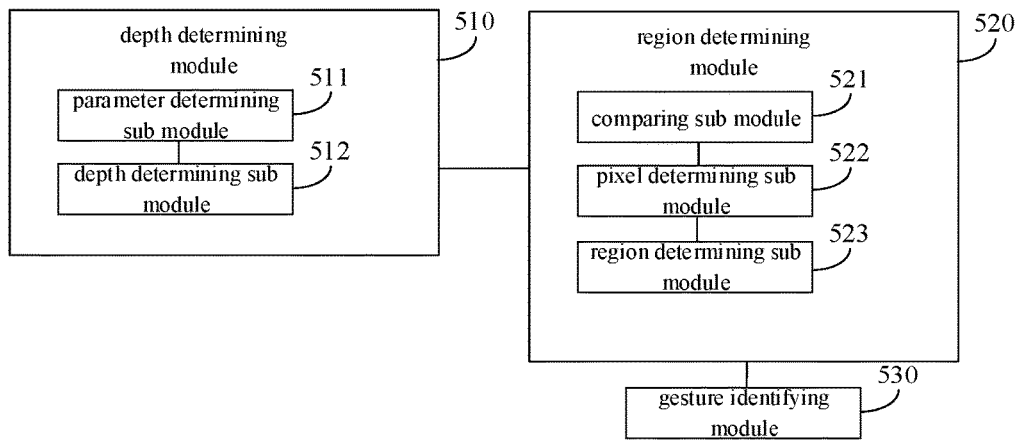
FIG. 6 is a block diagram illustrating a device for identifying a gesture, according to another aspect of the disclosure.

FIG. 6 is a block diagram illustrating a device for identifying a gesture, according to another aspect of the disclosure. As illustrated as FIG. 6, based on embodiments shown in FIG. 5, in an embodiment, the depth determining module 510 includes a parameter determining sub module 511 and a depth determining sub module 512.

The parameter determining sub module 511 is configured to determine camera parameters of the plurality of cameras.

The depth determining sub module 512 is configured to calculate the depth of each pixel in each of the images to be processed according to the camera parameters of the plurality of cameras which are determined by the parameter determining sub module 511.

In some embodiments, the region determining module 520 includes a comparing sub module 521, a pixel determining sub module 522, and a region determining sub module 523.

The comparing sub module 521 is configured to compare the depth of each pixel with a target depth. The target depth is configured to represent a maximum distance between a hand of the target user and the mobile apparatus.

The pixel determining sub module 522 is configured to determine a pixel having a depth less than the target depth as a pixel to be processed in each of the images to be processed.

The region determining sub module 523 is configured to determine a region composed of pixels to be processed which are determined by the pixel determining sub module 522 as the target region.

Figure 7:
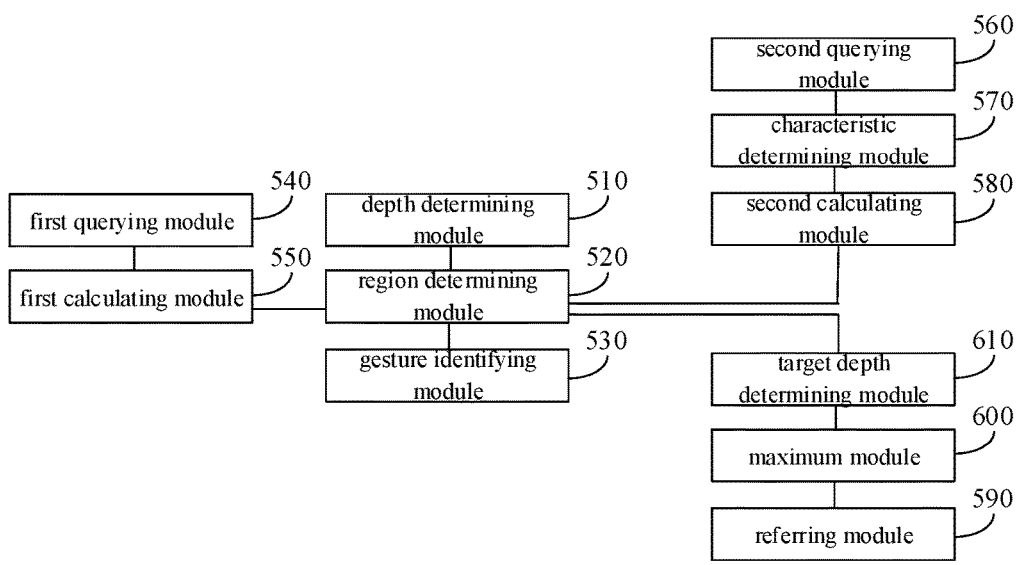
FIG. 7 is a block diagram illustrating a device for identifying a gesture, according to yet another aspect of the disclosure.

FIG. 7 is a block diagram illustrating a device for identifying a gesture, according to yet another aspect of the disclosure. As shown in FIG. 7, based on examples shown in FIG. 5 and FIG. 6, the device may further include a first querying module 540 and a first calculating module 550.

The first querying module 540 is configured to determine a first physical characteristic of the target user by querying a first characteristic database. The first characteristic database is configured to record user identification information and first physical characteristics corresponding to the user identification information.

The first calculating module 550 is configured to calculate the target depth according to the first physical characteristic determined by the first querying module 540, such that the comparing sub module 521 compares the depth of each pixel with the target depth.

In some embodiments, the device may further include a second querying module 560, a characteristic determining module 570 and a second calculating module 580.

The second querying module 560 is configured to determine a second physical characteristic of the target user by querying a second characteristic database. The second characteristic database is configured to record user identification information and second physical characteristics corresponding to the user identification information The characteristic determining module 570 is configured to determine a first physical characteristic of the target user according the second physical characteristic determined by the second querying module 560.

The second calculating module 580 is configured to calculate the target depth according to the first physical characteristic determined by the characteristic determining module 570, such that the comparing sub module 621 compares the depth of each pixel with the target depth.

In an embodiment, the device may further include a referring module 590, a maximum module 600, and a target depth determining module 610.

The referring module 590 is configured to determine a plurality of reference distances between the hand of the target user and the mobile apparatus according to history image data collected by the plurality of cameras separately.

The maximum module 600 is configured to determine a maximum of the plurality of reference distances determined by the referring module 590.

The target depth determining module 610 is configured to determine the maximum of the plurality of reference distances as the target depth, such that the comparing sub module 521 compares the depth of each pixel with the target depth.

With respect to the devices in the above embodiments, the specific manners for performing operations for individual modules therein have been described in detail in the embodiments regarding the methods for identifying a gesture, which will not be elaborated herein.

Since the device embodiments substantially correspond to the method embodiments, reference is made to the description of the method embodiments. The above-described device embodiments are merely for the purpose of illustration. Those units described as separated components may or may not be physically separated, and those units described as a display component may or may not be physical units, i.e., either located at one place, or distributed onto a plurality of network units. The object of the present disclosure may be achieved by part or all of modules in accordance with practical requirements. It would be appreciated and executable by those skilled in the art without creative labor.

Figure 8:
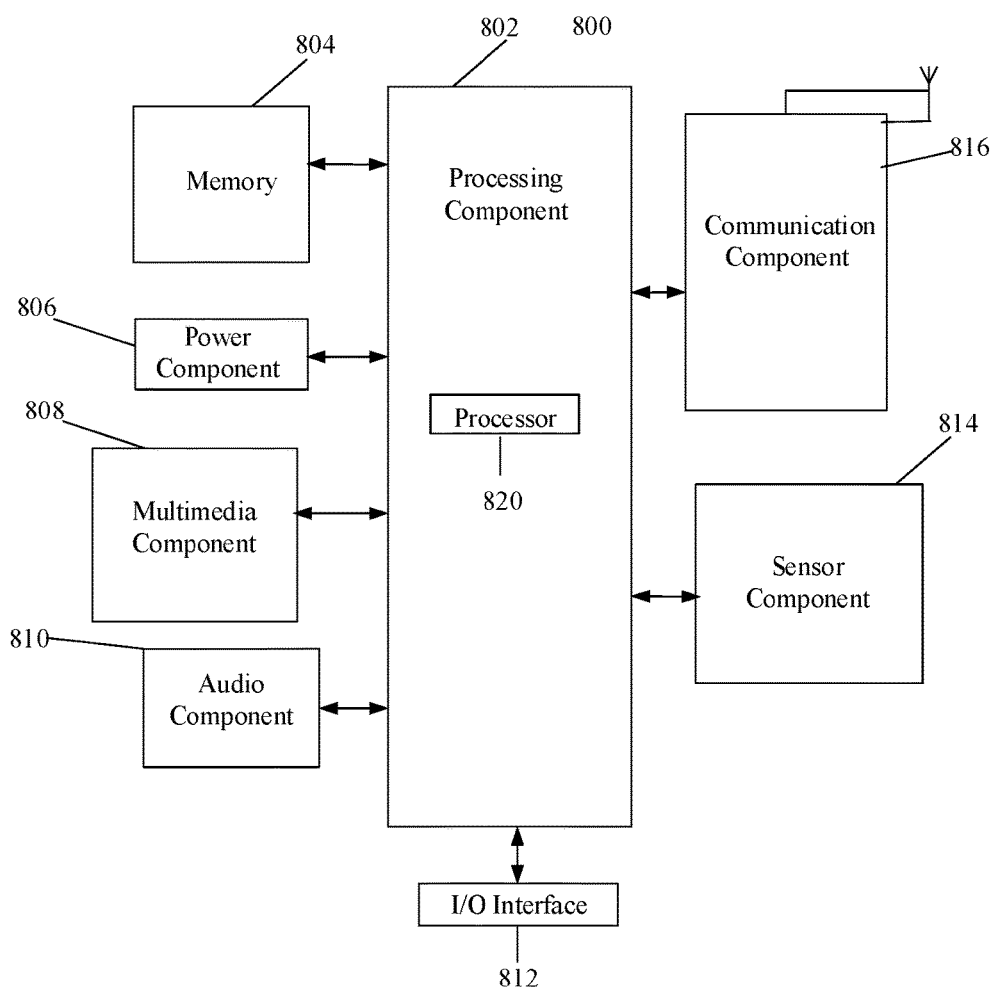
FIG. 8 is a block diagram illustrating an apparatus for identifying a gesture, according to an aspect of the disclosure.

FIG. 8 is a block diagram illustrating an apparatus for identifying a gesture, according to yet another aspect of the disclosure. For example, the device 800 may be a mobile apparatus, such as a smart phone, a tablet.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G or 3G or a combination thereof. In one aspect of the disclosure, the communication component 816 receives a broadcast signal or broadcast associated information from an external broadcast management system via a broadcast channel. In one aspect of the disclosure, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more embodiments, the device 800 may be implemented with one or more circuitry, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The device 800 may use the circuitry in combination with the other hardware or software components for performing the above described methods. Each module, sub-module, unit, or sub-unit in the disclosure may be implemented at least partially using the one or more circuitry.

In some embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for identifying a gesture, applied in a mobile apparatus comprising a plurality of cameras, the method comprising:
   determining a depth of each pixel in a plurality of images to be processed, wherein the plurality of images to be processed are separately collected by the plurality of cameras, and the depth is configured to at least partially represent a distance between an actual object point corresponding to each pixel and the mobile apparatus;
   determining a target region in each of the plurality of images to be processed according to the depth; and
   determining a gesture of a target user according to image information of target regions,
   wherein determining the target region in each of the plurality of images to be processed according to the depth comprises:
   comparing the depth of each pixel with a target depth, wherein the target depth is configured to represent a maximum distance between a hand of the target user and the mobile apparatus;
   determining a pixel having a depth less than the target depth as a pixel to be processed in each of the plurality of images to be processed; and
   determining a region composed of pixels to be processed as the target region.

2. The method according to claim 1, wherein determining the depth of each pixel in the plurality of images to be processed comprises:
   determining camera parameters of the plurality of cameras; and
   calculating the depth of each pixel in each of the plurality of images to be processed according to the camera parameters of the plurality of cameras.

3. The method according to claim 1, further comprising:
   determining a first physical characteristic of the target user by querying a first characteristic database, wherein the first characteristic database is configured to record user identification information and first physical characteristics corresponding to the user identification information; and
   calculating the target depth according to the first physical characteristic.

4. The method according to claim 1, further comprising:
   determining a first physical characteristic of the target user according to a second physical characteristic, wherein the second physical characteristic is obtained by querying a second characteristic database configured to record user identification information and second physical characteristics corresponding to the user identification information; and
   calculating the target depth according to the first physical characteristic.

5. The method according to claim 1, further comprising:
   determining a plurality of reference distances between the hand of the target user and the mobile apparatus according to history image data separately collected by the plurality of cameras;
   determining a maximum of the plurality of reference distances; and
   determining the maximum of the plurality of reference distances as the target depth.

6. An apparatus for identifying a gesture, comprising:
   a processor;
   a plurality of cameras in communication with the processor; and
   a memory configured to store instructions executable by the processor;
   wherein the processor is configured to:
   determine a depth of each pixel in each of images to be processed, wherein the images to be processed are collected by the plurality of cameras separately, and the depth is configured to at least partially represent a distance between an actual object point corresponding to each pixel and the apparatus;
   determine a target region of each of the images to be processed according to the depth; and
   determine a gesture of a target user according to image information of image regions to be processed,
   wherein, the processor is configured to determine the target region of each of the images to be processed according to the depth by acts of:
   comparing the depth of each pixel with a target depth, wherein the target depth is configured to represent a maximum distance between a hand of the target user and the apparatus;
   determining a pixel having a depth less than the target depth as a pixel to be processed in each of the images to be processed; and
   determining a region composed of pixels to be processed as the target region.

7. The apparatus according to claim 6, wherein the processor is configured to determine the depth of each pixel in each of images to be processed by acts of:
   determining camera parameters of the plurality of cameras; and
   calculating the depth of each pixel in each of the images to be processed according to the camera parameters of the plurality of cameras.

8. The apparatus according to claim 6, wherein the processor is further configured to:
   determine a first physical characteristic of the target user by querying a first characteristic database, wherein the first characteristic database is configured to record user identification information and first physical characteristics corresponding to the user identification information; and
   calculate the target depth according to the first physical characteristic.

9. The apparatus according to claim 6, wherein the processor is further configured to:
   obtain an additional physical characteristic of the target user by querying a second characteristic database, wherein the second characteristic database is configured to record user identification information and additional physical characteristics corresponding to the user identification information;
   determine a first physical characteristic of the target user according to the additional physical characteristic; and calculate the target depth according to the first physical characteristic.

10. The apparatus according to claim 6, wherein the processor is further configured to:
- determine a plurality of reference distances between the hand of the target user and the apparatus according to history image data collected by the plurality of cameras separately;
- determine a maximum of the plurality of reference distances; and
- determine the maximum of the plurality of reference distances as the target depth.

11. A non-transitory computer-readable storage medium having stored therein instructions that, when executed by a processor of a mobile apparatus, causes the mobile apparatus to perform method for identifying a gesture, wherein the mobile apparatus has a plurality of cameras, and the method comprises:
- determining a depth of each pixel in each of images to be processed, wherein the images to be processed are collected by the plurality of cameras separately, and the depth is configured to at least partially represent a distance between an actual object point corresponding to each pixel and the mobile apparatus;
- determining a target region of each of the images to be processed according to the depth; and
- determining a gesture of a target user according to image information of image regions to be processed,
- wherein determining a target region of each of the images to be processed according to the depth comprises:
- comparing the depth of each pixel with a target depth, wherein the target depth is configured to represent a maximum distance between a hand of the target user and the mobile apparatus;
- determining a pixel having a depth less than the target depth as a pixel to be processed in each of the images to be processed; and
- determining a region composed of pixels to be processed as the target region.

12. The non-transitory computer-readable storage medium according to claim 11, wherein determining the depth of each pixel in each of images to be processed comprises:
- determining camera parameters of the plurality of cameras; and
- calculating the depth of each pixel in each of the images to be processed according to the camera parameters of the plurality of cameras.

13. The non-transitory computer-readable storage medium according to claim 11, wherein the method further comprises:
- determining a first physical characteristic of the target user by querying a first characteristic database, wherein the first characteristic database is configured to record user identification information and first physical characteristics corresponding to the user identification information; and
- calculating the target depth according to the first physical characteristic.

14. The non-transitory computer-readable storage medium according to claim 11, wherein the method further comprises:
- determining an additional physical characteristic of the target user by querying a second characteristic database, wherein the second characteristic database is configured to record user identification information and additional physical characteristics corresponding to the user identification information;
- determining a first physical characteristic of the target user according the additional physical characteristic; and
- calculating the target depth according to the first physical characteristic.

15. The non-transitory computer-readable storage medium according to claim 11, wherein the method further comprises:
- determining a plurality of reference distances between the hand of the target user and the mobile apparatus according to history image data collected by the plurality of cameras separately;
- determining a maximum of the plurality of reference distances; and
- determining the maximum of the plurality of reference distances as the target depth.

* * * * *